United States Patent Office 3,790,515
Patented Feb. 5, 1974

3,790,515
POURABLE, STORABLE POLYMERIZABLE LACTAM-CATALYST-ACTIVATOR MIXTURES
Heinz Jörg Rosenbaum, Krefeld-Gartenstadt, and Hans Rudolph, Krefeld-Bockum, Germany, assignors to Bayer Aktiengesellschaft, Leverkusen, Germany
No Drawing. Filed Mar. 8, 1972, Ser. No. 232,902
Claims priority, application Germany, Mar. 10, 1971, P 21 11 412.5
Int. Cl. C08g 20/18
U.S. Cl. 260—18 N           8 Claims

ABSTRACT OF THE DISCLOSURE

A pourable, storable, polymerizable lactam-catalyst-activator mixture comprising at least one lactam having more than 5 ring members, at least one alkaline catalyst and at least one activator being embedded in an organic material.

---

This invention relates to pourable, storable polymerizable lactam-catalyst-activator mixtures which contain one or more activators embedded in hydrophobic organic material.

It is known that lactams, such as ε-caprolactam, caprylic lactam or lauric lactam, can be polymerized to form polyamides by activated anionic polymerization carried out in the presence of a basic catalyst and an activator.

Catalysts for the activated polymerization of lactams include alkali metal and alkaline earth metal compounds of lactams, for example sodium ε-caprolactamate; or of carboxylic acids having 1 to 6 carbon atoms, for example potassium formate; or of alcohols having up to 6 carbon atoms, for example sodium methoxide, potassium t-butoxide or sodium phenoxide; or alkali metal and alkaline earth metal hydrides, hydroxides and carbonates.

The activators used include, for example, isocyanates, such as hexamethylene-1,6-diisocyanate or phenyl isocyanate, or masked isocyanates such as hexamethylene-1,6-bis-(carbamido caprolactams), ketones, carbodiimides, acid chlorides, carboxylic acid esters, carboxylic acid imides, and triazines.

Mixtures of such lactams, catalysts and activators commonly used for activated anionic lactam polymerization are not stable on storage even if kept at room temperature with the exclusion of air and moisture. After a relatively short time they are incapable of being polymerized. It is very important to find a mixture which is stable on storage for simplifying the mixing of the components, transport, keeping reserve stocks and working up.

Lactam-catalyst-activator mixtures which are stable on storage at temperatures below 50° C. have been described in German offenlegungsschrift No. 1,570,403. They are prepared by using so-called "latent catalysts" which decompose into the reactive catalyst itself only at elevated temperatures of about 140° C. or more with the evolution of $CO_2$. These mixtures have the disadvantage that the polyamide produced contains bubbles caused by the evolution of $CO_2$.

So-called "one component catalysts," i.e. compounds which act both as activators and as catalysts, have also been described as forming storable polymerizable mixtures with lactams. These compounds are alkali metal compounds of amides and anilides, e.g. of N,N'-dimethyl-urea, urethanes, acylated hydroxamic acids or caprolactam-N-carboxylic acid anilides (French patent specification No. 1,553,382) or alkali metal salts of α-substituted β-ketoamides (German offenlegungsschrift No. 1,595,454 and French patent specification No. 1,544,070). These compounds have two disadvantages: firstly they are expensive to produce, and secondly they show little activator reactivity which necessitates long operating cycles for static casting, spray casting and rotary casting.

In addition, British patent specifications No. 928,313 and 928,314 describe lactam-catalyst mixtures, i.e. two-component mixtures, in which the catalyst is embedded in lactam tablets. Apart from the fact that the process by which they are produced is extremely expensive, mixtures of this kind are not sufficiently pourable and show a marked tendency towards disintegration into their components.

It has now surprisingly been found that a pourable, storable, polymerizable lactam-catalyst-activator mixture can be obtained by embedding the activator in hydrophobic organic material.

Accordingly, the invention relates to a pourable, storable, polymerizable lactam-catalyst-activator mixture comprising at least one lactam having more than 5 ring members, at least one alkaline catalyst and at least one activator being embedded in an organic material which contains at least one hydrophobic radical and which loses its barrier effect under the conditions of anionic polymerization, by melting or dissolving in the lactam melt.

The lactam-catalyst-activator mixtures preferably contain the activator or an activators' mixture embedded in a protective material which is solid at a temperature below 50° C. In principle, the embedded activator in the mixture may be any activator that is suitable for the anionic activated polymerization of lactams, for example isocyanates such as phenyl isocyanate, tolylene-1,4-diisocyanate, hexamethylene-1,6-diisocyanate, masked isocyanates such as caprolactam-N-carboxylic acid-N'-phenylamide, carbodiimides such as hexamethylene-1,6-bis-(carbamidocaprolactams), triazines such as triphenoxy-s-triazine, N-acyllactams such as N-stearoyl-caprolactam.

Suitable embedding materials include wax-like compounds having melting points above 50° C. and which lose their barrier effect at the polymerization temperature, i.e. at temperatures of from 100 to 250° C. by melting or dissolving in the lactam melt. The wax-like compounds contain in the molecule at least one hydrophobic radical having preferably at least 10 carbon atoms. Hydrophobic radicals such as these include, for example, linear or branched paraffin chains, optionally interrupted or substituted by aromatic or alicyclic groups or aliphatic, condensed ring systems. In principle, there is no upper limit to the number of carbon atoms in the molecule, because oligomeric and polymeric compounds are also suitable, providing they can be used in an embedding or encapsulating process and satisfy the above mentioned requirements.

The following are given as examples of such embedding materials: aliphatic hydrocarbons such as paraffins, e.g. hard paraffins, polyolefines, e.g. low molecular weight (high density) and high molecular weight (low density) polyethylenes and polystyrenes, fatty alcohols having 10 to 30 carbon atoms, e.g. stearyl alcohol, esters of fatty acids having 10 to 30 carbon atoms such as stearic acid p-nonyl-phenolate and cholanic acid butyl ester but also waxes and fats of natural or synthetic origin such as beeswax or beef tallow, amides and imides of fatty acids having 10 to 30 carbon atoms, e.g. N-stearyl phthalimide, behenic acid cyclohexylamide, stearic acid cyclohexylamide or acetic acid stearylamide; ketones having 10 to 30 carbon atoms such as stearone or civetone. Compounds which have other functions in addition to their function as protective material are particularly suitable for example long chained fatty alcohols and amides which also function as molecular weight regulating agents in the polymerization of lactams. Many of the compounds mentioned above also act as mould parting agents. Stearic acid cyclohexylamide is especially suitable. Mixtures of the above mentioned embedding materials may also be used.

Embedding can be effected for example, by spray drying, fluidized-bed coating, electrostatic spraying, coacervation, precipitating polymers from their solutions, and phase-interface (in situ) polymerization.

Effective embedding may also be achieved by mixing the activator with the embedding compound, melting the mixture and cooling the melt by any suitable method, leaving it to solidify and then size reducing it, e.g. by scaling it over a cooling roller. The pourable stable, polymerizable mixture is obtained by adding the lactam and the catalyst.

Liquid activators can also be converted into a pourable powder or microgranulate by the above mentioned embedding processes, and can in this way be made suitable for use in pourable lactam-catalyst-activator mixtures.

Both the grain size and the quantities ratio between the embedded and the embedding material can be varied in the aforementioned processes. The embedding material can be used in an amount of from 1 to 500% by weight, preferably in an amount of from 10 to 200% by weight, based on the material to be embedded.

The embedded activators can be used in an amount of from 0.1 to 20 mol percent preferably in an amount of from 1 to 10 mol percent of activator, based on the quantity of polymerizable lactam.

Lactams which have more than 5 ring members, e.g. $\beta$-pyrrolidone, $\epsilon$-caprolactam, oenantholactam, caprylolactam or lauric lactam are suitable for preparing the stable pourable mixtures according to the invention.

Any catalyst for the activated anionic polymerization of lactams, e.g. alkali metal and alkaline earth metal compounds of lactams such as sodium $\epsilon$-caprolactamate or of aliphatic carboxylic acids having 1 to 6 carbon atoms such as sodium formate or potassium formate or of alcohols having up to 6 carbon atoms such as sodium methylate, potassium tertiary butylate or sodium phenolate or alkali metal and alkaline earth metal hydrides, hydroxides, carbonates may be used.

The catalyst is added in quantities from 0.1 to 20, preferably 1 to 10 mols percent based on the lactam to be polymerized.

The overall mixture can be prepared in the conventional manner by mixing the three components, i.e. lactam, catalyst and embedded activator, at a temperature below 50° C. in the absence of moisture. It is also possible, however, to dissolve the catalyst in a molten lactam, to cool the melt, for example by means of a cooling roller, after which it is flaked off and subsequently added to the embedded activator used according to the invention.

Additives can also be introduced into these mixtures, either at the outset or before, during or after polymerization. Examples of these additives include regulators such as butyl acetamide; organic or inorganic pigments or dyes such as carbon black, titanium dioxide or phthalocyanines; plasticizers or mould-release agents; organic or inorganic fibres such as glass fibres or mats or fibrous asbestos; fillers such as glass balls, calcium carbonate or bentonite; flame-proofing agents such as red phosphorus, organic halogen compounds, phosphoric acid esters or metal oxides; blowing agents such as azides or hydrocarbons; and, finally, polymers as well, for example ground polycaprolactam waste, nylon 66 or polystyrene.

The mixtures according to the invention are stored in a sealed container with the exclusion of moisture. Surprisingly they are stable for weeks not only in a nitrogen atmosphere but also in air. They can be polymerized with undiminished activity even after 6 weeks.

In view of the extreme sensitivity of anionically polymerizable systems, it must be regarded as extremely surprising that the polymerizability of the mixtures according to the invention is in no way adversely affected by the embedding materials nor even by being stored in air.

On the contrary, these mixtures can readily be polymerized in the conventional manner at temperatures of from 140 to 300° C. Polymerization can be carried out either as a batch process, for example by gravity casting or by rotational casting, although it is best carried out continuously, for example in an injection-moulding apparatus, in a screw press or ram extruder, the polymerizable mixture being optionally fused in a preceding vessel and delivered by means of a gear pump into the heated barrel of the apparatus used.

Accordingly, the invention also relates to a process for the production of polyamides by the anionic polymerization of lactams having more than 5 ring members wherein the lactam is polymerized at a temperature of from 140 to 300° C. in the presence of an activator embedded in an organic material containing at least one hydrophobic radical and being solid at room temperature, and an alkaline catalyst.

The polymerization time and also the conversion rate, expressed by the extract content of the polyamide formed, serve as a measure of the storage stability of the mixtures according to the invention.

EXAMPLE 1

A mixture of 1150 g. of hexamethylene-1,6-bis-(carbamidocaprolactam) and 1000 g. of stearic acid cyclohexylamide is melted under nitrogen. The resulting melt is thoroughly mixed, and then flaked onto a cooling roller to give colorless flakes melting at 75 to 77° C.

Several 100 ml.-flasks with ground-glass stoppers are each filled with 56.6 g. of $\epsilon$-caprolactam, 0.3 g. of 85% by weight sodium caprolactamate in caprolactam and 1.12 g. of the embedded catalyst prepared as described above and tightly closed with a ground-glass stopper. The contents of the bottles are thoroughly mixed by shaking and then stored. After intervals of 0, 11, 20, 39, 60 and 80 days, respectively one of the flasks is placed in a stirring apparatus immersed in an oil bath heated to 210° C. and its content is polymerized. The polymerization time is the time elapsing from immersion of the flask the point in time at which the polyamide formed can no longer be stirred. The polyamide is then heated for another 30 minutes at 210° C. and cooled.

| Flask | Storage time (days) | Polymerization time (minutes) |
| --- | --- | --- |
| 1 | 0 | 3.8 |
| 2 | 11 | 3.6 |
| 3 | 20 | 5.0 |
| 4 | 39 | 3.7 |
| 5 | 60 | 3.6 |
| 6 | 80 | 4.8 |

EXAMPLE 2

1150 g. of hexamethylene-1,6-bis-(carbamido-caprolactam), 1000 g. of stearic acid cyclohexylamide and 1000 g. of hard paraffin (M.P. 60–62° C.) are fused in air and the resulting melt flaked onto a cooling roller.

Samples are prepared as in Example 1, with the exception that 1.6 g. of the embedded activator, prepared as described above, are used. After storage, the procedure is as described in Example 1. The following results are obtained.

| Flask | Storage time (days) | Polymerization time (minutes) |
|---|---|---|
| 1 | 0 | 5.3 |
| 2 | 20 | 5.8 |
| 3 | 40 | 4.2 |
| 4 | 81 | 6.0 |

EXAMPLE 3

100 g. of hexamethylene-1,6-bis-(carbamido-caprolactam) and 100 g. of behenic acid cyclohexylamide are fused under nitrogen. The clear melt can be solidified in a mortar and powdered.

Samples are prepared as in Example 1 using 1 g. of this embedded activator but the flasks are purged three times by evacuation and eliminating the vacuum with nitrogen and then tightly sealed with a ground-glass stopper, and then stored in a drying chest at 50° C. Polymerization is carried out in the same way as described in Example 1.

| Flask | Storage time (days) | Polymerization time (minutes) |
|---|---|---|
| 1 | 6 | 6.0 |
| 2 | 13 | 6.7 |
| 3 | 20 | 6.6 |

EXAMPLE 4

30 kg. of behenic acid cyclohexylamide, 70 kg. of hexamethylene-1,6-bis-(carbamido-caprolactam) and 60 kg. of glycol monomethyl ether are heated at 70 to 75° C. to form a clear melt. This melt is extruded into 300 litres of water kept at 60° C. Following removal from the precipitation bath, a spherical product is formed, and is freed from adhering water in a shelf dryer at 45° C./0.1 to 50 torr.

Several 100 ml. ground-glass flasks are each filled with 56 g. (0.5 mol) of ε-caprolactam, 0.3 g. of 66% by weight sodium ε-caprolactamate in caprolactam and 1.2 g. of the embedded activator described above. The flasks are purged three times by evacuation and eliminating the vacuum with nitrogen and then tightly sealed with a ground-glass stopper. The polymerization is carried out as described in Example 1. After cooling the polyamide is sawn chopped and extracted for 12 hours with methanol.

| Flask | Storage time (days) | Polymerization time (minutes) | Extract content (percent by weight) |
|---|---|---|---|
| 1 | 31 | 4.2 | 7.6 |
| 2 | 65 | 5.2 | 6.6 |
| 3 | 129 | 4.7 | 7.9 |
| 4 | 170 | 4.6 | 6.9 |
| 5 | 205 | 4.5 | 8.1 |

EXAMPLE 5

After storage for 54 days, a mixture of 56 g. of ε-caprolactam, 0.3 g. of 66% by weight sodium ε-caprolactamate in caprolactam and 0.7 g. of hexamethylene-1,6-bis-(carbamido-caprolactam) embedded in behenic acid cyclohexyl amide (30% by weight of embedding, 70% by weight of embedded material) has a polymerization time of 5.3 minutes and an extract content of 8.0%.

EXAMPLE 6

Mixtures similar to those of Example 5 are prepared, except that, as activator, they each contain 1 g. of hexamethylene - 1,6 - bis-(carbamido-caprolactam) embedded 1:1 beeswax. The mixtures are polymerized and worked up as in Example 4.

| Flask | Storage time (days) | Polymerization time (minutes) | Extract content (percent by weight) |
|---|---|---|---|
| 1 | 25 | 5.5 | 7.0 |
| 2 | 106 | 4.8 | 7.2 |
| 3 | 147 | 6.3 | 6.8 |

EXAMPLE 7

Mixtures similar to those of Example 5 are prepared, caprolactam) embedded 1:1 in hard paraffin. The mixtures are polymerized and worked up as described in Example 4.

| Flask | Storage time (days) | Polymerization time (minutes) | Extract content (percent by weight) |
|---|---|---|---|
| 1 | 36 | 6.25 | 8.4 |
| 2 | 106 | 5.25 | 8.2 |
| 3 | 147 | 5.8 | 7.5 |

What is claimed is:

1. A pourable, polymerizable lactam-catalyst-activator composition comprising at least one lactam having more than 5 ring members, at least one activator in an amount of from 0.1 to 20 mol percent, based on the quantity of said lactam present, and a catalytic amount of at least one alkaline catalyst, said activator being embedded within 1 to 500% by weight, based on the weight of said activator, of a wax-like compound having a melting point above 50° C. and containing in the molecule at least one hydrophobic radical having at least 10 carbon atoms and losing its barrier effect under the conditions of anionic polymerization by melting or dissolving in the lactam melt, whereby said embedded activator is isolated from said lactam and said catalyst prior to polymerization.

2. A mixture as claimed in claim 1, wherein the embedding material is paraffin, polyolefin, fatty alcohol having 10 to 30 carbon atoms, ester, amide or imide of a fatty acid having 10 to 30 carbon atoms, a wax or fat of natural or synthetic origin or ketone having 10 to 30 carbon atoms.

3. A mixture as claimed in claim 1, wherein the embedding material is hard paraffin, low molecular weight or high molecular weight polyethylene, polystyrene, stearyl alcohol, stearic acid, p-nonyl-phenolate, cholanic acid-butyl ester, beeswax, beef tallow, N-stearyl phthalimide, behenic acid cyclohexylamide, stearic acid cyclohexyl amide, acetic acid stearylamide, stearone or civetone.

4. A mixture as claimed in claim 1, wherein the lactam component is β-pyrrolidone, ε-caprolactam, oenantholactam, caprylolactam, or lauric lactam.

5. A mixture as claimed in claim 1, wherein as activator an isocyanate, masked isocyanate, carbodiimide, triazine or N-acyllactam is used.

6. A mixture as claimed in claim 1, wherein as activator phenyl isocyanate, tolylene-1,4-diisocyanate, hexamethylene-1,6-diisocyanate, caprolactam-N-carboxylic acid-N'-phenylamide, hexamethylene-1,6-bis-(carbamidocaprolactam), triphenoxy-s-triazine or N-stearoyl-caprolactam, is used.

7. A mixture as claimed in claim 1, wherein as catalyst an alkali metal or alkaline earth metal compound of a lactam of an aliphatic carboxylic acid having 1 to 6 carbon atoms or of an alcohol having up to 6 carbon atoms is used.

8. A mixture as claimed in claim 1, wherein as catalyst sodium ε-caprolactamate, sodium formate, potassium formate, sodium methylate, potassium tert.-butylate or sodium phenolate is used.

(References on following page)

References Cited

UNITED STATES PATENTS

| | | | |
|---|---|---|---|
| 3,470,139 | 9/1969 | Marshall et al. | 260—78 |
| 3,539,662 | 11/1970 | Hill et al. | 260—78 |
| 3,541,041 | 11/1970 | Hermann et al. | 260—78 |
| 3,513,135 | 5/1970 | Hermann et al. | 260—78 |
| 3,454,537 | 7/1969 | Tokiura et al. | 260—857 |
| 3,262,989 | 7/1966 | Brignac | 260—28 |
| 3,498,956 | 3/1970 | Birkner | 260—78 |
| 3,309,343 | 3/1967 | Darnell et al. | 260—78 |
| 3,567,696 | 3/1971 | Sahler | 260—78 |

FOREIGN PATENTS

| | | | |
|---|---|---|---|
| 928,313 | 6/1963 | Great Britain | 260—78 |
| 928,314 | 6/1963 | Great Britain | 260—78 |

DONALD E. CZAJA, Primary Examiner

E. C. RZUCIDLO, Assistant Examiner

U.S. Cl. X.R.

260—28, 31.2 N, 32.4 R, 32.6 N, 32.8 N, 33.4 R, 33.6 R, 78 L, 857 UN; 264—300